United States Patent
Oishi et al.

(10) Patent No.: US 7,973,849 B2
(45) Date of Patent: Jul. 5, 2011

(54) IMAGE TAKING APPARATUS

(75) Inventors: Hiroyuki Oishi, Asaka (JP); Hajime Inoue, Asaka (JP); Toshiharu Izumi, Asaka (JP); Tadashi Jogetsu, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 846 days.

(21) Appl. No.: 11/875,425

(22) Filed: Oct. 19, 2007

(65) Prior Publication Data

US 2008/0094488 A1    Apr. 24, 2008

(30) Foreign Application Priority Data

Oct. 20, 2006  (JP) ................... 2006-285817

(51) Int. Cl.
- G02B 13/16 (2006.01)
- G02B 15/14 (2006.01)
- G02B 7/02 (2006.01)
- H04N 5/225 (2006.01)
- H04N 5/232 (2006.01)
- G03B 13/00 (2006.01)

(52) U.S. Cl. ......... 348/335; 348/357; 359/694; 359/819

(58) Field of Classification Search .................. 348/335, 348/373–374, 241; 359/694, 819

See application file for complete search history.

(56) References Cited

U.S. PATENT DOCUMENTS

| | | | | |
|---|---|---|---|---|
| 6,080,101 | A * | 6/2000 | Tatsuno et al. | 600/112 |
| 7,310,236 | B2 * | 12/2007 | Takahashi et al. | 361/757 |
| 7,454,129 | B2 * | 11/2008 | Fukai | 396/55 |
| 2001/0009443 | A1 * | 7/2001 | Suemoto et al. | 348/358 |
| 2005/0237637 | A1 * | 10/2005 | Lung | 359/819 |
| 2006/0291853 | A1 * | 12/2006 | Lee et al. | 396/529 |
| 2007/0097518 | A1 * | 5/2007 | Sanou et al. | 359/694 |

FOREIGN PATENT DOCUMENTS

| | | |
|---|---|---|
| JP | 05056916 A | 3/1993 |
| JP | 07038789 A | 2/1995 |

* cited by examiner

Primary Examiner — Jason Chan
Assistant Examiner — Pritham Prabhakher
(74) Attorney, Agent, or Firm — Sughrue Mion, PLLC

(57) ABSTRACT

An aspect of the present invention provides an image taking apparatus, comprising: a solid-state image sensor; and a taking lens including a lens barrel that houses a lens disposed in front of the solid-state image sensor, wherein a shielding member that blocks an electromagnetic wave radiated from the front surface of the solid-state image sensor is provided on an outer circumference of the lens barrel, and a metallic member electrically floating in the lens barrel is grounded.

6 Claims, 8 Drawing Sheets

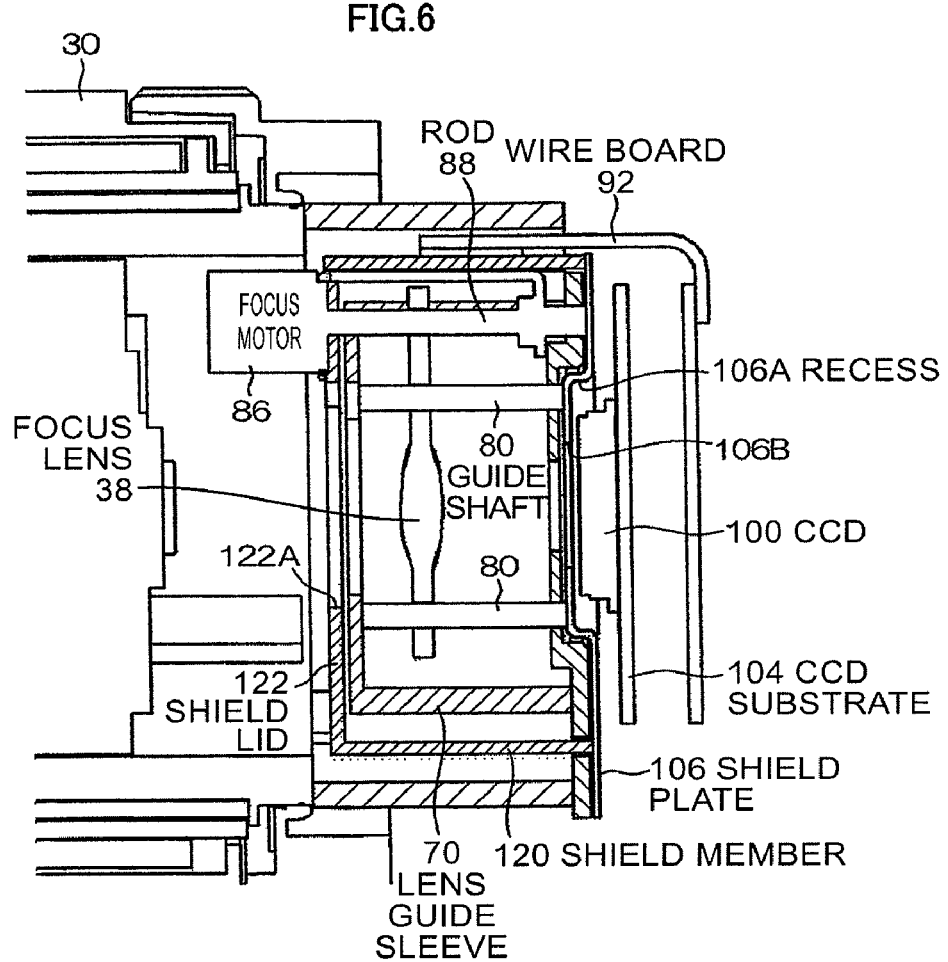

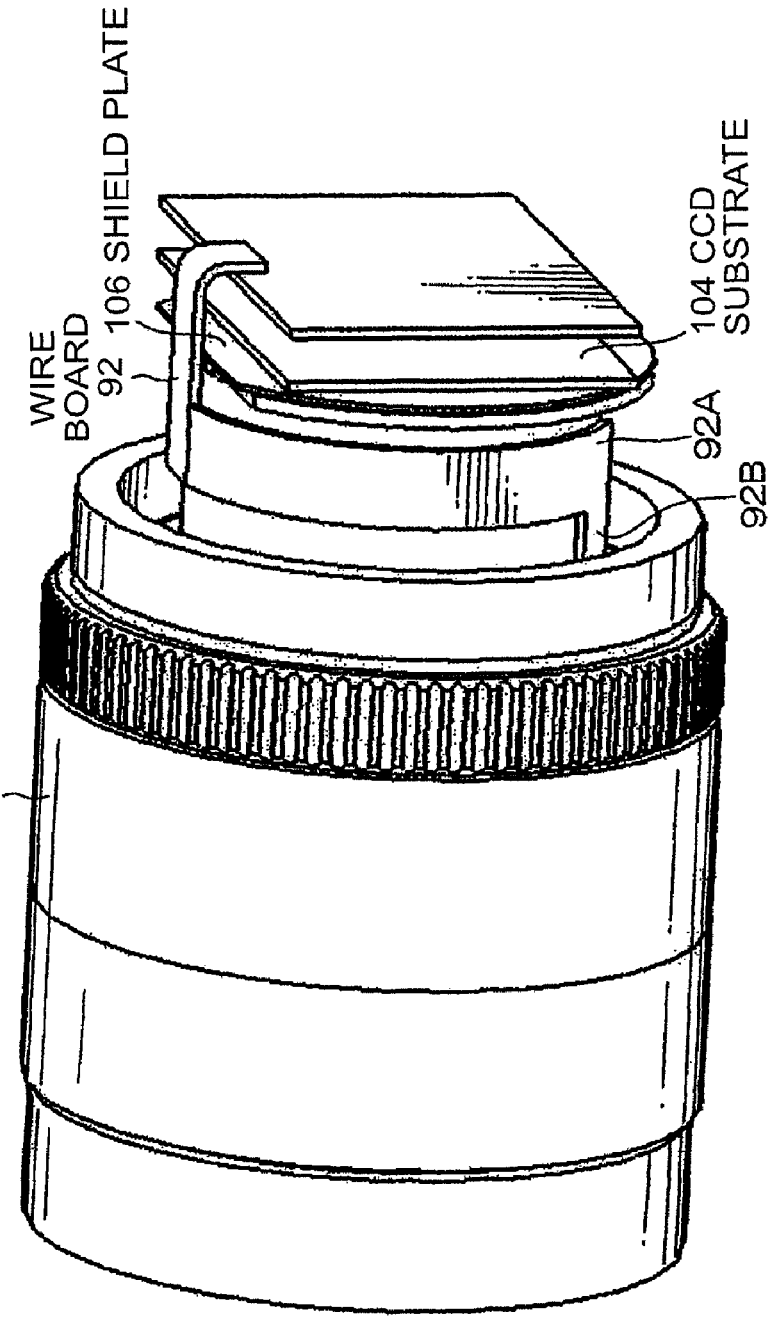

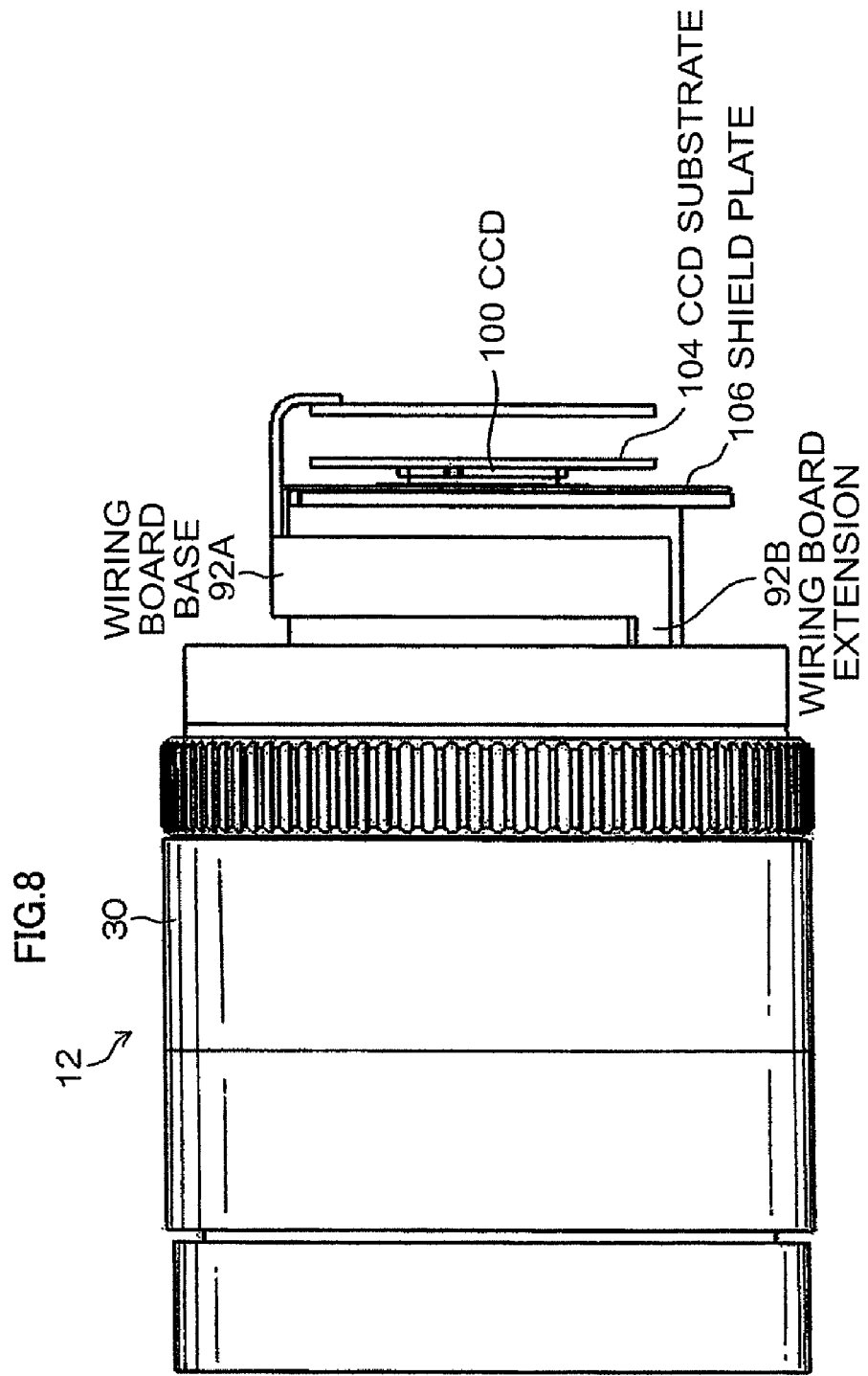

US 7,973,849 B2

IMAGE TAKING APPARATUS

BACKGROUND OF THE INVENTION

1. Field of the Invention

The present invention relates to an image taking apparatus. More specifically, it relates to a technique for eliminating electromagnetic interference (EMI).

2. Description of the Related Art

There is an increasing demand for digital cameras, such as digital still camera and digital video camera, that incorporate a solid-state image sensor, such as charge coupled device (CCD) and complementary metal oxide semiconductor (CMOS).

In recent years, solid-state image sensors are improved in resolution, and accordingly, digital cameras are required to read image signals from a solid-state image sensor at higher clock frequency to read image signals at higher rate.

A conventional digital camera, which drives the solid-state image sensor at a clock frequency of 30 MHz, does not have a problem of EMI. However, if the clock frequency is raised to 60 MHz or higher, there arises a problem that an electromagnetic wave higher than the criterion level occurs via the taking lens of the digital camera.

Although the drive circuit for driving the solid-state image sensor generates the strongest electromagnetic wave, the electromagnetic wave can be blocked by surrounding the drive circuit with a shielding member. However, there remains a problem that the electromagnetic wave generated from the front of the solid-state image sensor driven by the drive circuit cannot be blocked by the shielding member because the optical path for picture taking has to be ensured.

In order to solve the problem, there have been proposed a solid-state image sensor module for an endoscope and an image taking apparatus that have an optically-transparent electromagnetic shielding layer on the light-receiving surface of the solid-state image sensor.

SUMMARY OF THE INVENTION

However, if an optically-transparent electromagnetic shielding layer is disposed on the light-receiving surface of the solid-state image sensor or the like as described in the Japanese Patent Application Laid-Open Nos. 5-56916 and 7-38789, the amount of light incident on the solid-state image sensor decreases. If the thickness of the electromagnetic shielding layer is reduced to avoid the decrease of the amount of incident light, there arises a problem that the shielding effect becomes inadequate.

The present invention has been made in view of such circumstances, and an object of the present invention is to provide an image taking apparatus that can solve the problem of EMI of an electromagnetic wave radiated from the front surface of a solid-state image sensor without an optically-transparent electromagnetic shielding layer disposed on the light-receiving surface of the solid-state image sensor or the like.

In order to attain the object described above, according to a first aspect of the present invention, there is provided an image taking apparatus comprising: a solid-state image sensor; and a taking lens including a lens barrel that houses a lens disposed in front of the solid-state image sensor, in which a shielding member that blocks an electromagnetic wave radiated from a front surface of the solid-state image sensor is provided on an outer circumference of the lens barrel, and a metallic member electrically floating in the lens barrel is grounded.

The inventors have found that if the electromagnetic wave radiated from the front surface of the solid-state image sensor is incident on the electrically floating metallic member, the metallic member serves as a resonant antenna and radiates a strong electromagnetic wave.

Thus, the shielding member that blocks the electromagnetic wave radiated from the front surface of the solid-state image sensor is provided on the outer circumference of the lens barrel, thereby providing the electromagnetic wave radiated from the front surface of the solid-state image sensor with a certain directivity in the direction of the optical axis of the taking lens, thereby preventing the electromagnetic wave from being incident on the metallic member electrically floating in front of the solid-state image sensor. In addition, the metallic member electrically floating in the lens barrel is grounded, thereby preventing the metallic member from serving as a resonant antenna. It is to be noted that the strength of the electromagnetic wave itself that is radiated from the front surface of the solid-state image sensor and travels straight substantially in the direction of the optical axis of the taking lens is sufficiently lower than the level that causes the EMI problem.

According to a second aspect of the present invention, in the image taking apparatus according to the first aspect of the present invention, the shielding member covers the outer circumference of the lens barrel and the front surface of the lens barrel except for an opening of the lens barrel. Since the shielding member covers the front surface of the lens barrel except for the opening of the lens barrel, the directivity of the electromagnetic wave radiated from the front surface of the solid-state image sensor is further increased.

According to a third aspect of the present invention, the image taking apparatus according to the first or second aspect of the present invention further comprises a shielding plate that covers the front surface of the solid-state image sensor except for a light-receiving area thereof, and the shielding plate blocks an electromagnetic wave radiated from the front surface of the solid-state image sensor except for the light-receiving area. Since the electromagnetic wave is radiated from only the light-receiving area of the front surface of the solid-state image sensor, the area that radiates the electromagnetic wave is minimized.

According to a fourth aspect of the present invention, in the image taking apparatus according to any of the first to third aspects of the present invention, the taking lens is a rear focus type zoom lens including a first lens group for changing magnification and a second lens group disposed in the rear of the first lens group for performing correction and focusing when changing magnification, and the lens barrel is a focus lens guide sleeve that houses the second lens group.

According to a fifth aspect of the present invention, in the image taking apparatus according to the fourth aspect of the present invention, the metallic member is a guide shaft for a focus lens that moves in the focus lens guide sleeve.

Since the guide shaft for the focus lens that moves in the focus lens guide sleeve is electrically floating, and the electromagnetic wave radiated from the front surface of the solid-state image sensor is incident on the guide shaft, the guide shaft would otherwise serve as a resonant antenna and radiate a strong electromagnetic wave. However, since the guide shaft is grounded, the guide shaft is prevented from serving as a resonant antenna.

According to a sixth aspect of the present invention, in the image taking apparatus according to the fourth aspect of the present invention, the metallic member is a guide shaft for a focus lens that moves in the focus lens guide sleeve, and one end of the guide shaft is in contact with the shielding plate and thereby grounded. Thus, the guide shaft can be grounded without increasing the number of components (of course, the shielding plate is grounded).

According to a seventh aspect of the present invention, in the image taking apparatus according to any of the first to sixth aspects of the present invention, the taking lens is connected to a flexible wiring board and has a driving device that drives an optical member in the taking lens, and the flexible wiring board is laid along the shielding member in such a manner that a length of a part of the flexible wiring board between the driving device and the shielding member is minimized.

If the electromagnetic wave is incident on the flexible wiring board, the flexible wiring board radiates an electromagnetic wave. However, since the length of the part of the flexible wiring board on which the electromagnetic wave is incident (the length of the part of the flexible wiring board between the driving device and the front end of the lens barrel covered with the shielding member) is minimized, the wiring pattern on the flexible wiring board is prevented from serving as a resonant antenna and radiating an electromagnetic wave, or the electromagnetic wave radiated by the wiring pattern on the flexible wiring board is minimized.

According to an eighth aspect of the present invention, in the image taking apparatus according to the seventh aspect of the present invention, the driving device includes two or more of a shutter actuator, a diaphragm actuator, a camera-shake correcting actuator and a focusing actuator, and the two or more actuators are placed at different circumferential positions in the taking lens. Thus, the flexible wiring board has a number of branches at one end depending on the number of actuators and is wound around the shielding member according to the circumferential positions of the actuators in the taking lens.

According to the present invention, the metallic members electrically floating in the taking lens are electromagnetically shielded, and any metallic member that cannot be electromagnetically shielded is grounded. Therefore, if the electromagnetic wave is radiated from the front surface of the solid-state image sensor, the metallic members are prevented from serving as a resonant antenna and radiating a strong electromagnetic wave. Therefore, even if the solid-state image sensor is driven at a high clock frequency (60 MHz or higher, for example), the EMI problem can be avoided.

BRIEF DESCRIPTION OF THE DRAWINGS

FIG. 6 is an enlarged view of essential parts of the taking lens shown in FIG. 5;

FIG. 7 is a schematic perspective view showing a configuration of the taking lens according to the other embodiment; and FIG. 8 is a schematic side view showing a configuration of the taking lens according to the other embodiment.

DETAILED DESCRIPTION OF THE PREFERRED EMBODIMENTS

In the following, an image taking apparatus according to a preferred embodiment of the present invention will be described with reference to the accompanying drawings.

Figure 1:
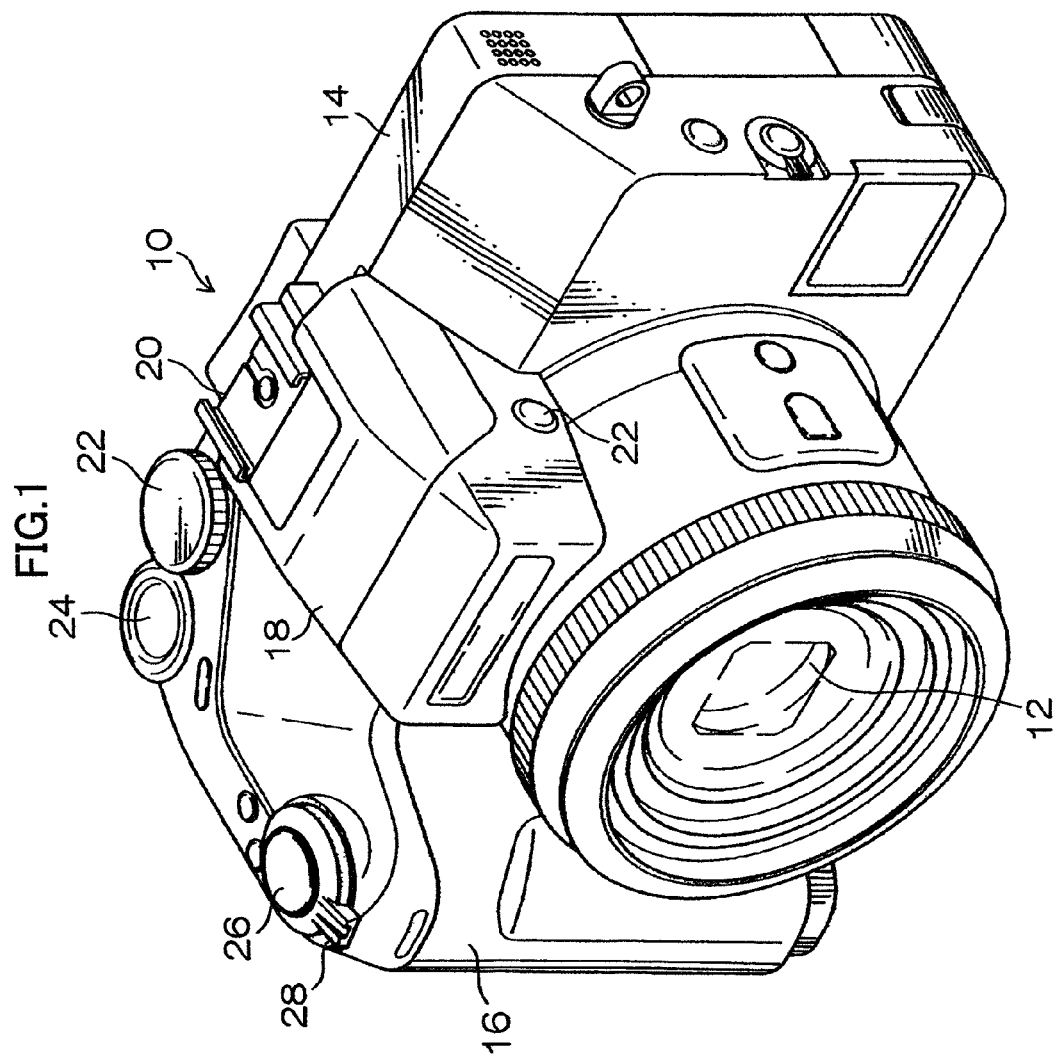
FIG. 1 is a front perspective view showing an appearance of a digital camera according to an embodiment of the present invention.

FIG. 1 is a front perspective view showing an appearance of a digital camera to which the present invention is applied.

As shown in FIG. 1, a digital camera 10 is a lens-integrated single-lens reflex camera incorporating an electronic viewfinder, and a taking lens 12 is attached to the front of a camera main body 14 to form an integral unit.

The camera main body 14 is L-shaped, a left-hand part thereof constitutes a grip 16, and the taking lens 12 is attached to the front thereof to form an integral unit. The taking lens 12 is a rear focus type zoom lens and has an optical camera-shake correcting function.

Figure 2:
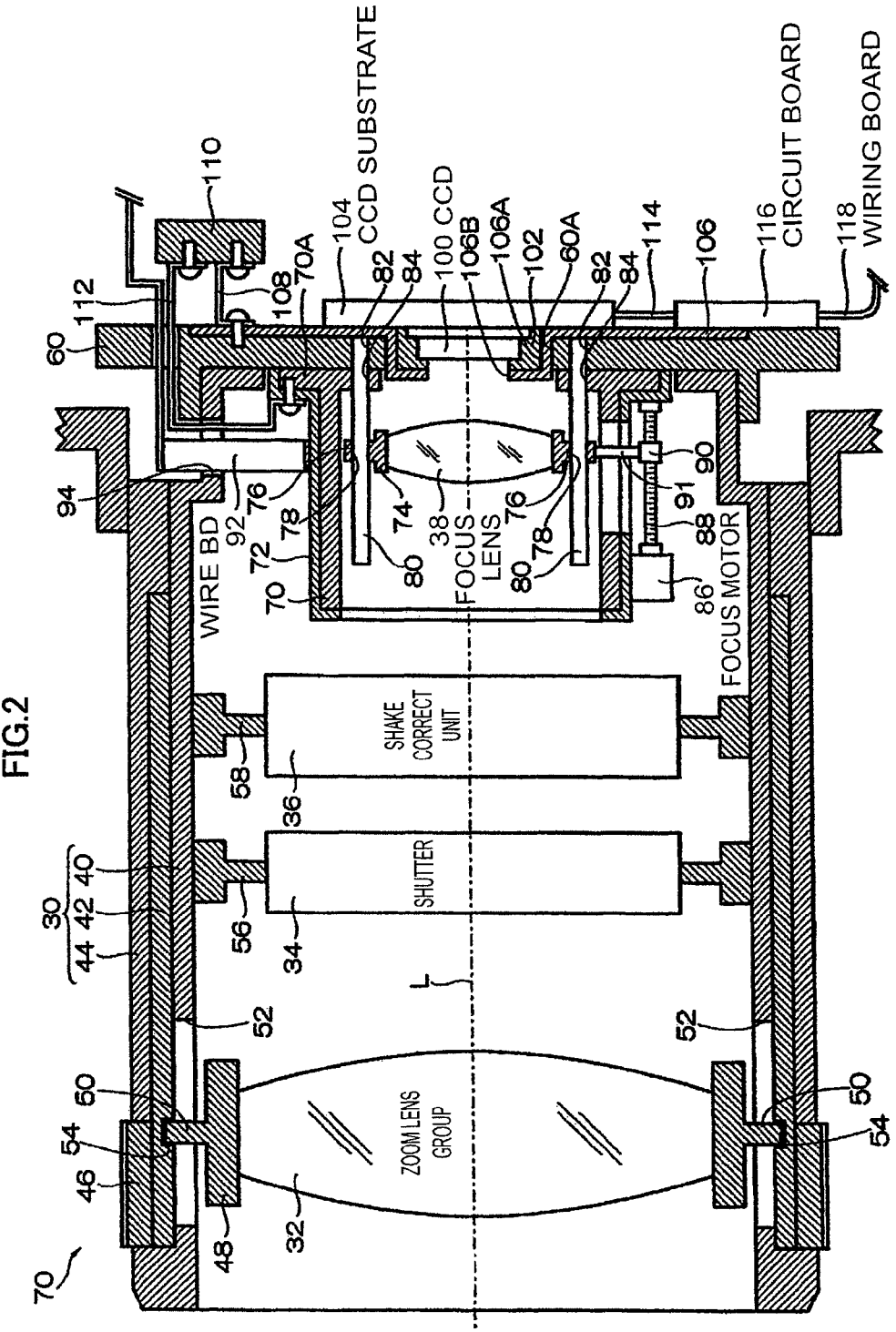
FIG. 2 is a schematic cross-sectional view showing a configuration of a taking lens.
Figure 3:
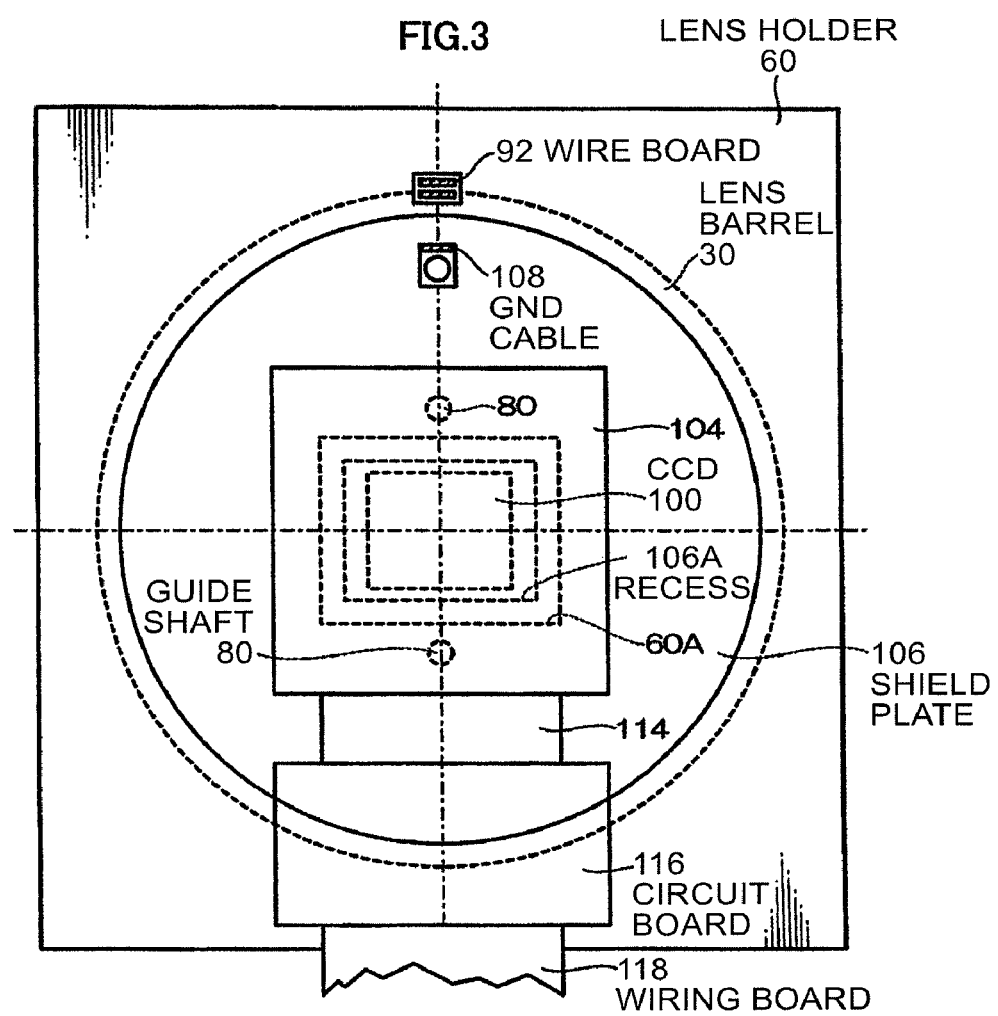
FIG. 3 is a schematic rear view showing a configuration of the taking lens.

The camera main body 14 has a pop-up type flash device 18, a hot shoe 20, a mode dial 22, a command dial 24, a shutter button 26, a power lever 28 and the like on the top thereof. Although not shown, the camera main body 14 further has an electronic viewfinder, a liquid crystal monitor, a cross-hair button, a menu button, an OK button, a cancel button and the like on the back side thereof. FIG. 2 is a schematic cross-sectional view showing a configuration of the taking lens 12, and FIG. 3 is a rear view of the taking lens 12.

As described above, the taking lens 12 is a rear focus type zoom lens with an optical camera-shake correcting function. In a lens barrel 30 thereof, a zoom lens group 32, a diaphragm/shutter unit 34, a camera-shake correcting unit 36, and a focus lens group 38 are housed and arranged along an optical axis L in this order from the front end of the lens barrel 30.

The lens barrel 30 includes a cylindrical inner sleeve 40, a rotating sleeve 42 that is fitted over the outer circumference of the inner sleeve 40 and capable of rotating, and an outer sleeve 44 that covers the outer circumference of the rotating sleeve 42. The lens barrel 30 is attached to a lens holder 60 in the camera main body 14. The outer sleeve 44 is fixed to the inner sleeve 40 at the base end thereof, and the rotating sleeve 42 rotates in the space between the inner sleeve 40 and the outer sleeve 44.

A zoom ring 46 is integrally attached to a front end part of the rotating sleeve 42 and extends forward from the front end of the outer sleeve 44. The rotating sleeve 42 is rotated in the space between the inner sleeve 40 and the outer sleeve 44 by rotating the zoom ring 46.

The lens holder 60 has a plate-like shape and has an opening 60A for a CCD in the middle thereof (on the optical axis L). The lens holder 60 has an integrally formed holding frame 62 for holding the lens barrel 30 on front surface thereof. The lens barrel 30 is attached to the lens holder 60 by fitting the base end part of the inner sleeve 40 into the holding frame 62 and integrally fixed to the lens holder 60 by fixing the base end part of the inner sleeve 40 to the lens holder 60 by a screw (not shown).

The lens holder 60 is fixed to a main body frame (not shown) of the camera main body 14 by a screw (not shown). Therefore, the lens barrel 30 is integrally fixed to the camera main body 14 by fixing the lens barrel 30 to the lens holder 60.

The zoom lens group 32 is to adjust the magnification of the taking lens 12. The zoom lens group 32 is held in a zoom lens frame 48.

The zoom lens frame 48 has a cylindrical shape and has three cam pins 50 extending radially on the outer circumference thereof Each cam pin 50 is inserted in a straight groove 52 formed in the inner sleeve 40, and the tip end thereof is fitted into a cam groove 54 formed in the inner surface of the rotating sleeve 42.

If the zoom ring 46 and thus the rotating sleeve 42 rotate, the zoom lens frame 48 moves back and forth along the optical axis L as a result of interaction among the cam pins 50, the straight grooves 52 and the cam grooves 54. Thus, the zoom lens group 32 also moves back and forth along the optical axis L, thereby changing the focal length of the taking lens 12.

The diaphragm/shutter unit 34 is to adjust the aperture and exposure of the taking lens 12. The diaphragm/shutter unit 34 is fixed to the inner surface of the inner sleeve 40 by a bracket 56 and has a diaphragm and a mechanical shutter (not shown). The diaphragm is driven by a diaphragm actuator (not shown) incorporated in the diaphragm/shutter unit 34 to adjust the aperture of the taking lens 12. The mechanical shutter is driven by a shutter actuator (not shown) incorporated in the diaphragm/shutter unit 34 to adjust the exposure of a CCD.

The camera-shake correcting unit 36 is to compensate for an image blurring on the imaging surface caused by hand movement. The camera-shake correcting unit 36 is fixed to the inner surface of the inner sleeve 40 by a bracket 58 and has a correcting lens (not shown). The correcting lens is capable of moving in a plane perpendicular to the optical axis L in the panning and the tilting direction. The correcting lens is driven by a camera-shake correcting actuator (not shown) incorporated in the camera-shake correcting unit 36 in a direction to eliminate the image blurring. In this way, the image blurring on the imaging surface caused by hand movement is compensated for.

The focus lens group 38 is to make a correction and a focus adjustment when changing the magnification. The focus lens group 38 is housed in a focus lens guide sleeve 70 disposed in the inner sleeve 40.

The focus lens guide sleeve 70 has a cylindrical shape, and the outer surface thereof is covered with a metallic shielding member 72 capable of blocking electromagnetic waves. Typically, the shielding member is made of a conductive metal, and the shielding effect is improved if the shielding member is grounded.

The focus lens guide sleeve 70 is disposed on the optical axis L and integrally fixed to the lens holder 60 by fixing a flange part 70A integrally formed at the base end part thereof to the lens holder 60 by a screw (not shown).

The focus lens group 38 housed in the focus lens guide sleeve 70 is held in a focus lens frame 74. A pair of guide parts 76 extends from the outer circumference of the focus lens frame 74. Each guide part 76 has a guide hole 78 formed along the optical axis L, and a guide shaft 80 extending in the focus lens guide sleeve 70 along the optical axis L is inserted in each guide hole 78. The focus lens frame 74 is slidably supported by the guide shafts 80, and thus, the focus lens group 38 is supported so that the focus lens group 38 can move along the optical axis L.

The guide shaft 80 slidably supporting the focus lens frame 74 is made of metal and cantilevered with the base end part inserted in through holes 82 and 84 formed in the lens holder 60 and the focus lens frame 74, respectively. The inner diameter of the through holes 82 and 84 are slightly smaller than the outer diameter of the guide shaft 80, so that the guide shaft 80 is supported by interference fit into the through holes 82 and 84. As described later, the base end part of the guide shaft 80 is exposed at the back surface of the lens holder 60 through the through hole 82 and is in contact with a metallic shielding plate 106 attached to the lens holder 60.

A focusing motor 86 is mounted on the outer circumference of the focus lens guide sleeve 70, and a threaded rod 88 extending along the optical axis L is coupled to the rotating shaft of the focusing motor 86. A nut member 90 is screwed onto the threaded rod 88, and the nut member 90 is coupled with one of the guide parts 76 of the focus lens frame 74 via a coupling member 91. When the focusing motor 86 is activated and rotates the threaded rod 88, the nut member 90 moves along the threaded rod 88 back and forth according to the rotation of the threaded rod 88, thereby making the focus lens group 38 held in the focus lens frame 74 move back and forth along the optical axis L.

For example, transmission of a driving signal and supply of electric power to the focusing motor 86 for driving the focus lens group 38 are accomplished via a flexible wiring board 92 connected to a main board (not shown) in the camera main body 14. Similarly, for example, transmission of a driving signal and supply of electric power to the diaphragm actuator for driving the diaphragm of the diaphragm/shutter unit 34, the shutter actuator for driving the mechanical shutter, and the camera-shake correcting actuator for driving the correcting lens of the camera-shake correcting unit 36 are accomplished via the flexible wiring board 92.

Figure 4:
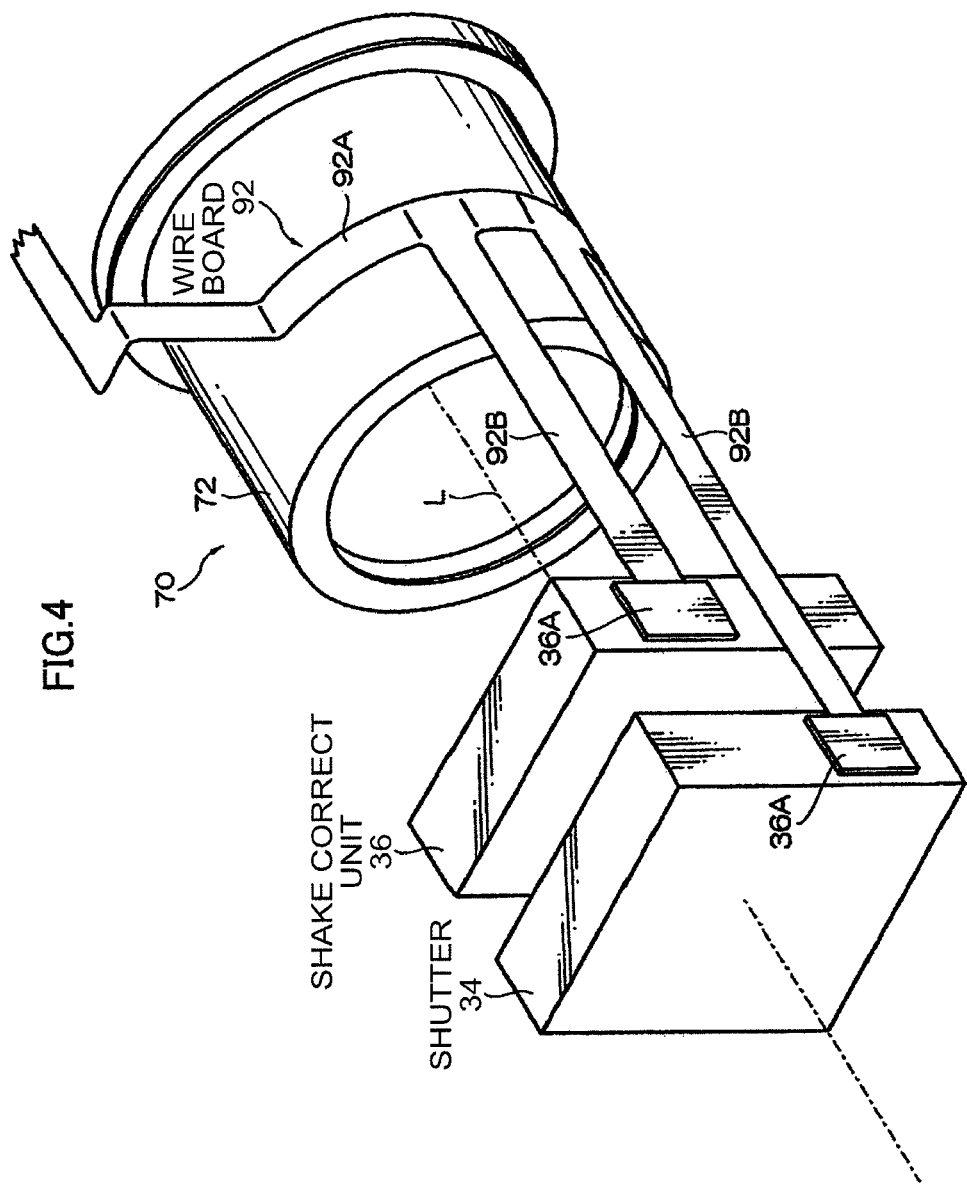
FIG. 4 is a perspective view showing a layout of a flexible wiring board.

The flexible wiring board 92 connected to the driving actuators in the taking lens 12 is introduced into the taking lens 12 through a wiring inlet 94 formed in the outer circumference of the base end part of the inner sleeve 40 and laid along the outer circumference of the focus lens guide sleeve 70 covered with the shielding member 72 as shown in FIG. 4. The flexible wiring board 92 laid along the outer circumference of the focus lens guide sleeve 70 covered with the shielding member 72 has branches for the driving actuators disposed in front of the focus lens guide sleeve 70 that extend straight along the optical axis L. Specifically, the flexible wiring board 92 has a base part 92A that is laid along the outer circumference of the focus lens guide sleeve 70 covered with the shielding member 72 and extension parts 92B that extend from the base part 92A perpendicularly along the optical axis L, and the straight extension parts 92B of the flexible wiring board 92 are connected to the driving actuators positioned in front of the focus lens guide sleeve 70.

Thus, the length of the part of the flexible wiring board from the front end of the focus lens guide sleeve 70 to the wiring connection part of each driving actuator positioned in front of the focus lens guide sleeve 70 covered with the shielding member 72 can be minimized, so that the effect of unwanted radiation can be minimized.

In this embodiment, since the diaphragm actuator and the shutter actuator in the diaphragm/shutter unit 34 and the camera-shake correcting actuator in the camera-shake correcting unit 36 are positioned in front of the focus lens guide sleeve 70 covered with the shielding member 72, the extension parts 92B extending straight are connected to wiring connection parts 34A and 36A of the actuators.

In this embodiment, one flexible wiring board 92 has branches, and the branches are connected to the wiring connection parts of the driving actuators. However, separate flexible wiring boards may be prepared and connected to the wiring connection parts of the driving actuators.

The taking lens 12 is configured as described above, and a CCD 100 is attached to the lens holder 60 with the taking lens 12 attached thereto.

In this embodiment, a CCD is used as the solid-state image sensor. However, other solid-state image sensors, such as a CMOS device, can also be used.

The CCD 100 is integrally attached to a CCD substrate 104 via a CCD holder 102. The CCD 100 is attached to the lens holder 60 by fixing the CCD substrate 104 to the lens holder 60 at a predetermined position on the back surface thereof by a screw (not shown).

The shielding plate 106 capable of blocking an electromagnetic wave is attached to the back surface of the lens holder 60 to which the CCD 100 is attached. The shielding plate 106 is to block the electromagnetic wave radiated from the front surface of the CCD 100 except for the light-receiving area.

The shielding plate 106 is made of metal and has a disk-like shape, and the outer diameter of the shielding plate 106 is larger than the inner diameter of the lens barrel 30.

The shielding plate 106 has a depressed part 106A, into which the CCD holder 102 can be fitted, at the center thereof. An opening 106B, the size of which is substantially equal to that of the light-receiving area of the CCD 100, is formed in the depressed part 106A.

The shielding plate 106 is attached to the lens holder 60 by fitting the depressed part 106A into the opening 60A of the lens holder 60. The shielding plate 106 is integrally fixed to the lens holder 60 by a screw (not shown).

The metallic shielding plate 106 attached to the lens holder 60 is connected to a metallic frame 110 of the camera main body 14 via a grounding cable 108. In other words, the shielding plate 106 is grounded.

The metallic shielding member 72 covering the outer surface of the focus lens guide sleeve 70 described above is also connected to the metallic frame 110 of the camera main body 14 via a grounding cable 112. In other words, the shielding member 72 is also grounded.

As a result of attachment of the shielding plate 106 to the lens holder 60, the guide shafts 80 are in contact with the shielding plate 106, and therefore, the guide shafts 80 are also grounded.

The CCD 100 is attached to the lens holder 60 by fixing the CCD substrate 104 to the lens holder 60 with the shielding plate 106 by a screw (not shown). Once the CCD 100 is attached to the lens holder 60, only the light-receiving area is exposed through the opening 60A of the lens holder 60, while the other area is covered with the shielding plate 106. Thus, the electromagnetic wave radiated from the front surface of the CCD 100 except for the light-receiving area is blocked by the shielding plate 106.

A circuit board 116 is connected to the CCD substrate 104 with the CCD 100 attached thereto via a flexible wiring board 114 and fixed to the back surface of the lens holder 60 by a screw (not shown). A CCD driving circuit for driving the CCD 100, a lens driving CPU, an analog signal processing circuit that performs correlated double sampling of image signals output from the CCD 100 and appropriate gain amplification, an A/D converter circuit that converts the image signals processed by the analog signal processing circuit into digital image data (CCD-RAW data), a data communication circuit for transmitting the image data to the camera main body 14, and the like are mounted on the circuit board 116 and connected to the main board (not shown) in the camera main body 14 via a flexible wiring board 118.

The digital camera 10 thus configured according to this embodiment operates in the following manner.

The shielding plate 106 is attached to the lens holder 60 to which the CCD 100 is attached, and the electromagnetic wave radiated from the front surface of the CCD 100 except for the light-receiving area is blocked by the shielding plate 106.

The shielding plate 106 cannot block the electromagnetic wave radiated from the light-receiving area of the CCD 100 into the lens barrel 30. However, the digital camera 10 according to this embodiment has the focus lens guide sleeve 70 surrounding the space in front of the CCD 100, and the outer surface of the focus lens guide sleeve 70 is covered with the shielding member 72. As a result, the range of radiation of the electromagnetic wave from the light-receiving area of the CCD 100 is limited by the shielding member 72, and the electromagnetic wave has a certain directivity in the direction of the optical axis of the taking lens 12.

Since the electromagnetic wave radiated from the light-receiving area of the CCD 100 has a certain directivity in the direction of the optical axis of the taking lens 12, the electromagnetic wave can be prevented from being incident on a metallic member electrically floating in front of the CCD 100, and the metallic member can be effectively prevented from serving as a resonant antenna.

Thus, the problem of EMI does not arise even if the CCD 100 is driven at a high clock frequency (60 MHz, for example). Furthermore, the problem of EMI of the electromagnetic wave radiated from the front surface of the CCD 100 can be solved without an optically transparent electromagnetic shielding layer disposed on the light-receiving area of the CCD 100 or the like.

Although it is not possible to prevent the electromagnetic wave radiated from the light-receiving area of the CCD 100 from being incident on the metallic members disposed in the focus lens guide sleeve 70, the metallic members disposed in the focus lens guide sleeve 70 are grounded to prevent the members from serving as a resonant antenna. In the digital camera 10 according to this embodiment, the guide shafts 80 are such members. Thus, the guide shafts 80 are brought into contact with the metallic shielding plate 106 and thereby grounded, so that the guide shafts 80 are prevented from serving as a resonant antenna.

While the guide shafts 80 are brought into contact with the shielding plate 106 and thereby grounded in this embodiment, a grounding cable may be connected to the guide shafts 80, and the grounding cable may be connected to a frame or the like connected to the ground. However, if the guide shafts 80 are in contact with the shielding plate 106 and thereby grounded as in this embodiment, the number of components is reduced, and the structure is simplified.

In the digital camera 10 according to this embodiment, the guide shafts 80 are the only metallic members disposed in the focus lens guide sleeve 70. However, if there is another metallic member disposed in the focus lens guide sleeve 70, the member is also grounded by connecting the member to the shielding plate 106 as with the guide shafts 80 or the like. For example, if a screw is disposed in the focus lens guide sleeve 70, the screw is also grounded by connecting the screw to the shielding plate 106 or the like.

The flexible wiring board 92 also radiates an electromagnetic wave if an electromagnetic wave is incident thereon. However, in the digital camera 10 according to this embodiment, the flexible wiring board is laid in such a manner that the length of the part of the flexible wiring board on which the electromagnetic wave is incident (the length of the part of the flexible wiring board between the wiring connection part of each driving actuator and the front end of the focus lens guide sleeve 70 covered with the shielding member 72) is minimized, so that the wiring pattern on the flexible wiring board can be effectively prevented from serving as a resonant antenna and radiating an electromagnetic wave.

Such a layout is particularly advantageous in a case where the wiring inlet for the flexible wiring board and the wiring connection part of the driving actuator are circumferentially displaced from each other or in a case where the flexible wiring board is connected to a plurality of driving actuators, and the wiring connection parts of the driving actuators are circumferentially displaced from each other.

In this embodiment, the outer surface of the focus lens guide sleeve 70 is covered with the shielding member 72. However, the way of covering the outer surface of the focus lens guide sleeve 70 is not particularly limited. For example, the outer surface of the focus lens guide sleeve 70 can be covered with a metallic cover, which has a shape conforming to the contour of the focus lens guide sleeve 70 and serves as the shielding member. Alternatively, the outer surface of the focus lens guide sleeve 70 can be plated with metal, which serves as the shielding member.

Figure 5:
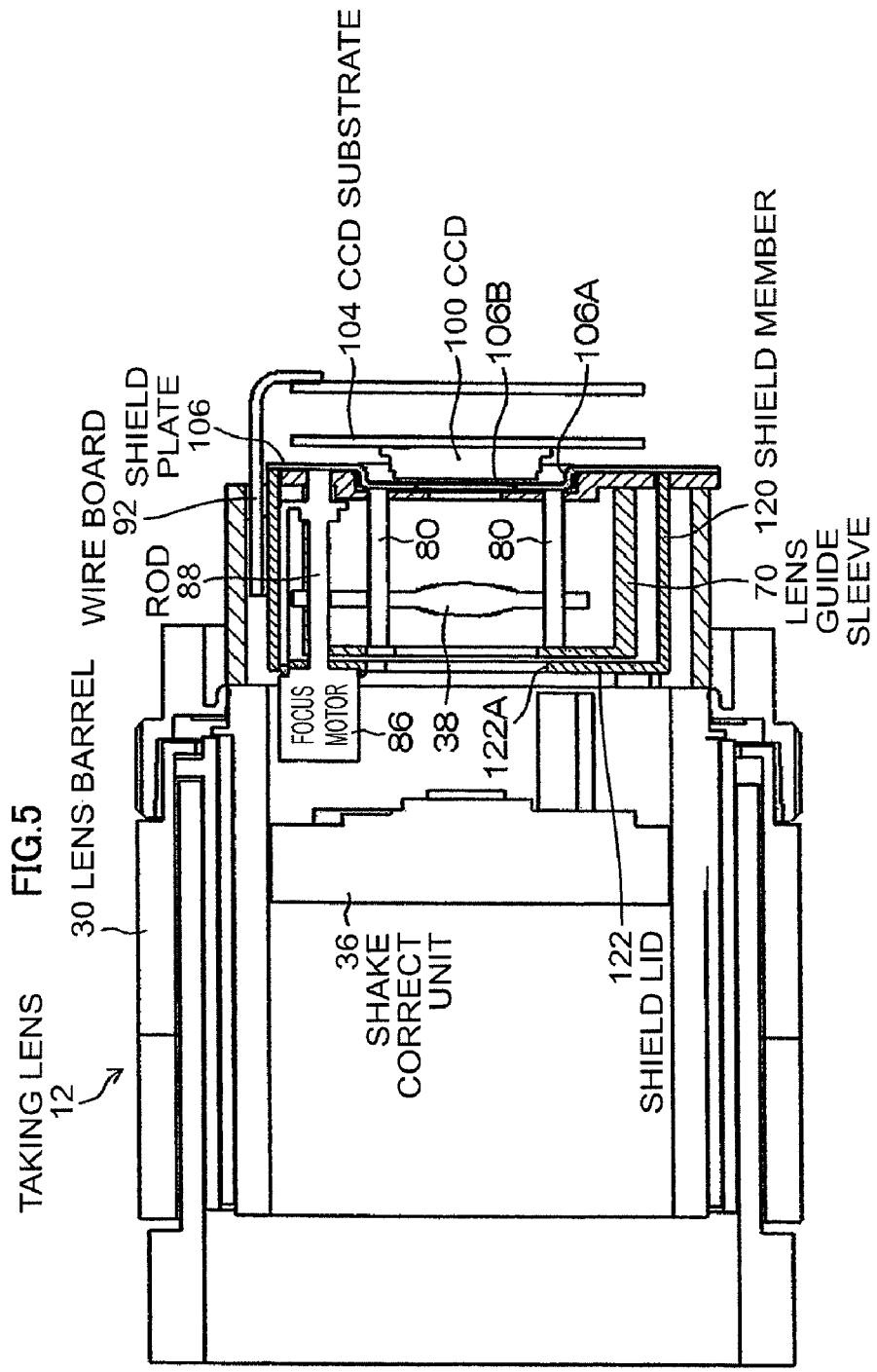
FIG. 5 is a schematic cross-sectional view showing a configuration of a taking lens according to another embodiment.

In this embodiment, the outer surface of the focus lens guide sleeve 70 is covered with the shielding member 72, thereby preventing the electromagnetic wave radiated from the front surface of the CCD 100 from being radiating in the radial direction. However, the shielding member can be separated from the focus lens guide sleeve 70. For example, as shown in FIGS. 5 and 6, the focus lens guide sleeve 70 can be surrounded by a cylindrical shielding member 120, and radial radiation of the electromagnetic wave radiated from the light-receiving area of the CCD 120 can be prevented by the cylindrical shielding member 120. In this case, preferably, the front end of the shielding member 120 is covered with a lid member 122, and an opening 122A having the minimum size required for exposure of the CCD 100 is formed in the lid member 122. If this is the case, radial radiation of the electromagnetic wave from the light-receiving area of the CCD 100 can be effectively blocked, and the electromagnetic wave radiated from the light-receiving area of the CCD 100 can have a directivity in the direction of the optical axis of the taking lens.

In the example shown in FIGS. 5 and 6, the shielding member 120 is connected directly to the shielding plate 106. Thus, a grounding cable can be omitted, and the structure can be further simplified. The metallic guide shafts 80 for guiding the focus lens group 38 are also connected directly to the shielding plate 106. In addition, the threaded rod 88 driven by the focusing motor 86 is also connected directly to the shielding plate 106. As a result, the focusing motor 86 and the threaded rod 88 are also prevented from serving as a resonant antenna.

In the case where the shielding member 120 separated from the focus lens guide sleeve 70 is used in this way, as shown in FIGS. 7 and 8, the flexible wiring board 92 for the driving actuators is laid to extend along the outer circumference of the shielding member 120. The flexible wiring board 92 for each driving actuator disposed in front of the shielding member 120 is laid so that the length thereof is minimized. Thus, the wiring pattern on the flexible wiring board 92 effectively is prevented from serving as a resonant antenna and radiating an electromagnetic wave.

While an example in which the present invention is applied to a digital camera has been described in this embodiment, the application of the present invention is not limited thereto, and the present invention can be applied to a video camera, and a digital camera incorporated in a cellular phone or the like, for example.

What is claimed is:

1. An image taking apparatus, comprising:
   a solid-state image sensor; and
   a taking lens including a lens barrel that houses a lens disposed in front of the solid-state image sensor,
   wherein a shielding member that blocks an electromagnetic wave radiated from a front surface of the solid-state image sensor is provided on an outer circumference of the lens barrel, and
   a metallic member electrically floating in the lens barrel is grounded, wherein the taking lens is connected to a flexible wiring board and has a driving device that drives an optical member in the taking lens, and
   the flexible wiring board is laid along the shielding member in such a manner that a length of a part of the flexible wiring board between the driving device and the shielding member is minimized.

2. The image taking apparatus according to claim 1, wherein the driving device includes two or more of a shutter actuator, a diaphragm actuator, a camera-shake correcting actuator and a focusing actuator, and the two or more actuators are placed at different circumferential positions in the taking lens.

3. An image taking apparatus, comprising:
   a solid-state image sensor; and
   a taking lens including a lens barrel that houses a lens disposed in front of the solid-state image sensor,
   wherein a shielding member that blocks an electromagnetic wave radiated from a front surface of the solid-state image sensor is provided on an outer circumference of the lens barrel, and
   a metallic member electrically floating in the lens barrel is grounded,
   wherein the shielding member covers the outer circumference of the lens barrel and the front surface of the lens barrel except for an opening of the lens barrel, and
   further comprising a shielding plate that covers the front surface of the solid-state image sensor except for a light-receiving area thereof,
   wherein the shielding plate blocks an electromagnetic wave radiated from the front surface of the solid-state image sensor except for the light-receiving area,
   wherein the taking lens is a rear focus type zoom lens including a first lens group for changing magnification and a second lens group disposed in the rear of the first lens group for performing correction and focusing when changing magnification, and
   the lens barrel is a focus lens guide sleeve that houses the second lens group, and
   wherein the metallic member is a guide shaft for a focus lens that moves in the focus lens guide sleeve, wherein the taking lens is connected to a flexible wiring board and has a driving device that drives an optical member in the taking lens,
   the flexible wiring board is laid along the shielding member in such a manner that a length of a part of the flexible wiring board between the driving device and the shielding member is minimized.

4. The image taking apparatus according to claim 3, wherein the driving device includes two or more of a shutter actuator, a diaphragm actuator, a camera-shake correcting actuator and a focusing actuator, and the two or more actuators are placed at different circumferential positions in the taking lens.

5. An image taking apparatus, comprising:
   a solid-state image sensor; and
   a taking lens including a lens barrel that houses a lens disposed in front of the solid-state image sensor,
   wherein a shielding member that blocks an electromagnetic wave radiated from a front surface of the solid-state image sensor is provided on an outer circumference of the lens barrel, and
   a metallic member electrically floating in the lens barrel is grounded,
   wherein the shielding member covers the outer circumference of the lens barrel and the front surface of the lens barrel except for an opening of the lens barrel, further comprising a shielding plate that covers the front surface of the solid-state image sensor except for a light-receiving area thereof, wherein the shielding plate blocks an electromagnetic wave radiated from the front surface of the solid-state image sensor except for the light-receiving area, wherein the taking lens is a rear focus type zoom lens including a first lens group for changing magnification and a second lens group disposed in the rear of the first lens group for performing correction and focusing when changing magnification, and the lens barrel is a focus lens guide sleeve that houses the second lens group, wherein the metallic member is a guide shaft for a focus lens that moves in the focus lens guide sleeve, and one end of the guide shaft is in contact with the shielding plate and thereby grounded, wherein the taking lens is connected to a flexible wiring board and has a driving device that drives an optical member in the taking lens, and the flexible wiring board is laid along the shielding member in such a manner that the length of the part of the flexible wiring board between the driving device and the shielding member is minimized.

6. The image taking apparatus according to claim 5, wherein the driving device includes two or more of a shutter actuator, a diaphragm actuator, a camera-shake correcting actuator and a focusing actuator, and the two or more actuators are placed at different circumferential positions in the taking lens.

* * * * *